US011306597B2

(12) United States Patent
Okabe et al.

(10) Patent No.: US 11,306,597 B2
(45) Date of Patent: Apr. 19, 2022

(54) COMPOSITE BLADE AND METHOD OF MANUFACTURING COMPOSITE BLADE

(71) Applicant: MITSUBISHI HEAVY INDUSTRIES, LTD., Tokyo (JP)

(72) Inventors: Ryoji Okabe, Tokyo (JP); Kentaro Shindo, Tokyo (JP); Masami Kamiya, Tokyo (JP); Yoshinori Nonaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 274 days.

(21) Appl. No.: 16/617,672

(22) PCT Filed: May 30, 2018

(86) PCT No.: PCT/JP2018/020779
§ 371 (c)(1),
(2) Date: Nov. 27, 2019

(87) PCT Pub. No.: WO2018/221596
PCT Pub. Date: Dec. 6, 2018

(65) Prior Publication Data
US 2020/0095873 A1 Mar. 26, 2020

(30) Foreign Application Priority Data

May 31, 2017 (JP) .............................. JP2017-108379

(51) Int. Cl.
*F01D 5/28* (2006.01)
*F01D 5/30* (2006.01)

(52) U.S. Cl.
CPC .............. *F01D 5/282* (2013.01); *F01D 5/30* (2013.01); *F05D 2230/00* (2013.01); *F05D 2300/603* (2013.01)

(58) Field of Classification Search
CPC ....... F01D 5/282; F01D 5/30; F05D 2300/603
See application file for complete search history.

(56) References Cited

U.S. PATENT DOCUMENTS 3,132,841 A * 5/1964 Wilder, Jr. .............. F01D 5/282
416/219 R
4,040,770 A 8/1977 Carlson
(Continued)

FOREIGN PATENT DOCUMENTS

CN 105518256 4/2016
JP 2000-154702 6/2000
(Continued)

OTHER PUBLICATIONS

Written Opinion of the International Searching Authority dated Aug. 14, 2018 in International (PCT) Patent Application No. PCT/JP2018/020779, with English Translation.
(Continued)

*Primary Examiner* — Michael L Sehn
(74) *Attorney, Agent, or Firm* — Wenderoth, Lind & Ponack, L.L.P.

(57) ABSTRACT

A composite blade includes an airfoil; and a blade root including a straight section from a blade end part being a connection location with the airfoil to an inclination start part between the blade end part and a base end, and a bearing section from the inclination start part to the base end. A laminate of composite layers with reinforced fibers impregnated with resin is provided across the airfoil and the blade root. A metal body is provided on the blade root. The laminate extends along the longitudinal direction in the airfoil and in the straight section, and extends to be inclined away from a center axis in the bearing section. The metal body is provided on both surfaces of the laminate in the blade root, extends along the longitudinal direction in the
(Continued)

straight section, and extends to be inclined away from the center axis in the bearing section.

8 Claims, 7 Drawing Sheets

(56) References Cited

U.S. PATENT DOCUMENTS

| | | | |
|---|---|---|---|
| 4,655,687 A * | 4/1987 | Atkinson | F01D 11/008 416/190 |
| 5,240,375 A | 8/1993 | Wayte | |
| 6,033,185 A | 3/2000 | Lammas et al. | |
| 7,828,526 B2 | 11/2010 | Cairo et al. | |
| 2012/0308391 A1 | 12/2012 | Garin et al. | |
| 2013/0247586 A1 | 9/2013 | Luczak | |
| 2016/0245100 A1 | 8/2016 | Luczak | |
| 2016/0341052 A1 | 11/2016 | Li et al. | |

FOREIGN PATENT DOCUMENTS

| | | |
|---|---|---|
| JP | 2013-217227 | 10/2013 |
| JP | 5331368 | 10/2013 |
| JP | 2016-527426 | 9/2016 |

OTHER PUBLICATIONS

International Search Report dated Aug. 14, 2018 in International (PCT) Patent Application No. PCT/JP2018/020779.
Office Action dated Jul. 29, 2021 in Chinese Patent Application No. 201880035189.4, with English-language translation.

* cited by examiner

COMPOSITE BLADE AND METHOD OF MANUFACTURING COMPOSITE BLADE

FIELD

The present disclosure relates to a composite blade and a method of manufacturing the composite blade.

BACKGROUND

A turbine blade of a gas turbine includes an airfoil for receiving gas and a blade root (dovetail part) provided on the terminal end of the airfoil. The blade root is fitted into a groove provided in a turbine disk. The structure of the blade root is such that the turbine blade does not come off from the groove in the turbine disk, even when a centrifugal force is applied to the turbine blade, because the thickness of the blade root is greater than that of the airfoil.

In recent years, a composite material is sometimes used as a material for the turbine blade of the gas turbine as described above. The composite material is formed by laying up composite layers obtained by impregnating reinforced fibers with resin. When the composite material is used for the turbine blade, a composite layer (reinforced fibers) is sometimes extended across the airfoil and the blade root. Moreover, Patent Literature 1 discloses a technique of forming a turbine blade by bonding the composite layer and a metal based material.

CITATION LIST

Patent Literature

Patent Literature 1: Japanese Patent No. 5331368

SUMMARY

Technical Problem

When a gas turbine is operated, a centrifugal force is applied to the turbine blade. In a part where the blade root comes into contact with the groove in the turbine disk, the blade root is pressed against the inner surface of the groove, due to the centrifugal force. Thus, when the composite layer is used for the blade root, the resin part of the composite layer may be worn out, due to the pressing force against the inner surface of the groove. Moreover, because the reinforced fibers of the composite layer are sometimes harder than the turbine disk, the groove of the turbine disk may be worn out. Thus, when the composite material is used for the turbine blade, it is desired to prevent abrasion of the blade root of the turbine blade and the turbine disk.

The present disclosure has been made to solve the above-mentioned problems, and an object of the present disclosure is to provide a composite blade and a method of manufacturing the composite blade that can prevent the abrasion of a blade root of a turbine blade and a turbine disk, when the composite material is used for the turbine blade.

Solution to Problem

To solve the problems described above and achieve the object, a composite blade according to the present disclosure includes an airfoil extending in a longitudinal direction; and a blade end part including a straight section that is a section from a blade end part being a connection location with the airfoil to an inclination start part being a location between the blade end part and a base end, and a bearing section that is a section from the inclination start part to the base end. A laminate formed by laying up composite layers in which reinforced fibers are impregnated with resin is provided across the airfoil and the blade root. A metal body is provided on the blade root. The laminate extends along the longitudinal direction in the airfoil, extends along the longitudinal direction in the straight section, and extends so as to be inclined in a direction away from a center axis along the longitudinal direction of the airfoil toward the base end of the blade root in the bearing section. The metal body is provided on one surface and another surface of the laminate in the blade root, extends along the longitudinal direction in the straight section, and extends so as to be inclined in a direction away from the center axis toward the base end in the bearing section.

It is preferable that, in the metal body, an angle of a surface on an opposite side to the laminate in the bearing section with respect to the longitudinal direction is greater than an angle of a surface on the laminate side in the bearing section with respect to the longitudinal direction.

It is preferable that the composite blade includes an adhesive layer that is provided between the metal body and the laminate to bond the metal body and the laminate.

It is preferable that the adhesive layer includes a soft adhesive layer provided on the blade end part side at the straight section, and a high strength adhesive layer provided at the bearing section, and the high strength adhesive layer has a higher rapture strength and a higher elastic modulus than the soft adhesive layer.

It is preferable that, on a surface on the adhesive layer side at the straight section, the metal body includes a notch part that is provided across a notch start part and the blade end part, the notch start part being between the inclination start part and the blade end part, the notch part having a depth increasing from the notch start part toward the blade end part.

It is preferable that the adhesive layer is provided on a surface of the laminate in the airfoil, across the blade end part and an adhesive end part that is between a tip part of the airfoil on an opposite side to the blade end part and the blade end part, and the adhesive layer has a thickness increasing from the notch start part toward the blade end part in the blade root and a thickness decreasing from the blade end part toward the adhesive end part in the airfoil.

It is preferable that the composite blade further includes an overlay part that is a sheet-like member that covers from an end surface of the metal body in the blade end part to a surface of the laminate on the tip part side with respect to the adhesive end part is, via a surface of the adhesive layer from the blade end part to the adhesive end part.

It is preferable that, on the surface at the side opposite to the laminate in the straight section, the metal body includes a thin part that is thinned to a depth at a location between the surface on the opposite side to the laminate to the surface on the laminate side.

It is preferable that the thin part is a groove that is provided across a thinning start part and the blade end part, the thinning start part being between the inclination start part and the blade end part, the thinning start part has a depth increasing from the thinning start part toward the blade end part.

It is preferable that the blade root is attached to a turbine disk including a straight groove that extends along the longitudinal direction, and a bearing groove that is connected to an end part of the straight groove, and that spreads in a direction away from a center axis of the straight groove as the bearing groove is separated from an end part of the straight groove, the straight section is disposed in the straight groove, and the bearing section is disposed in the bearing groove.

To solve the problems described above and achieve the object, a method according to the present disclosure is of manufacturing a composite blade that includes an airfoil extending in a longitudinal direction; and a blade end part including a straight section that is a section from a blade end part being a connection location with the airfoil to an inclination start part being a location between the blade end part and a base end, and a bearing section that is a section from the inclination start part to the base end. The method includes: a laminate forming step of forming a laminate that is formed by laying up composite layers in which reinforced fibers are impregnated with resin and is provided across the airfoil and the blade root; and a metal body forming step of forming a metal body that is provided on the blade root. The laminate forming step includes forming the laminate such that the laminate extends along the longitudinal direction in the airfoil, extends along the longitudinal direction in the straight section, and extends so as to be inclined in a direction away from a center axis along the longitudinal direction of the airfoil toward the base end of the blade root in the bearing section. The metal body forming step includes forming the metal body such that the metal body is provided on one surface and another surface of the laminate in the blade root, extends along the longitudinal direction in the straight section, and extends so as to be inclined in a direction away from the center axis toward the base end in the bearing section.

Advantageous Effects of Invention

When a composite material is used for a turbine blade, the present disclosure can prevent abrasion of a blade root of the turbine blade and a turbine disk.

DESCRIPTION OF EMBODIMENTS

Hereinafter, preferred embodiments of the present invention will be described in detail with reference to the accompanying drawings. However, the present invention is not limited to the embodiments, and in the case where there are a plurality of embodiments, the present invention also includes those configured by combining the respective embodiments.

Entire Configuration of Composite Blade

Figure 1:
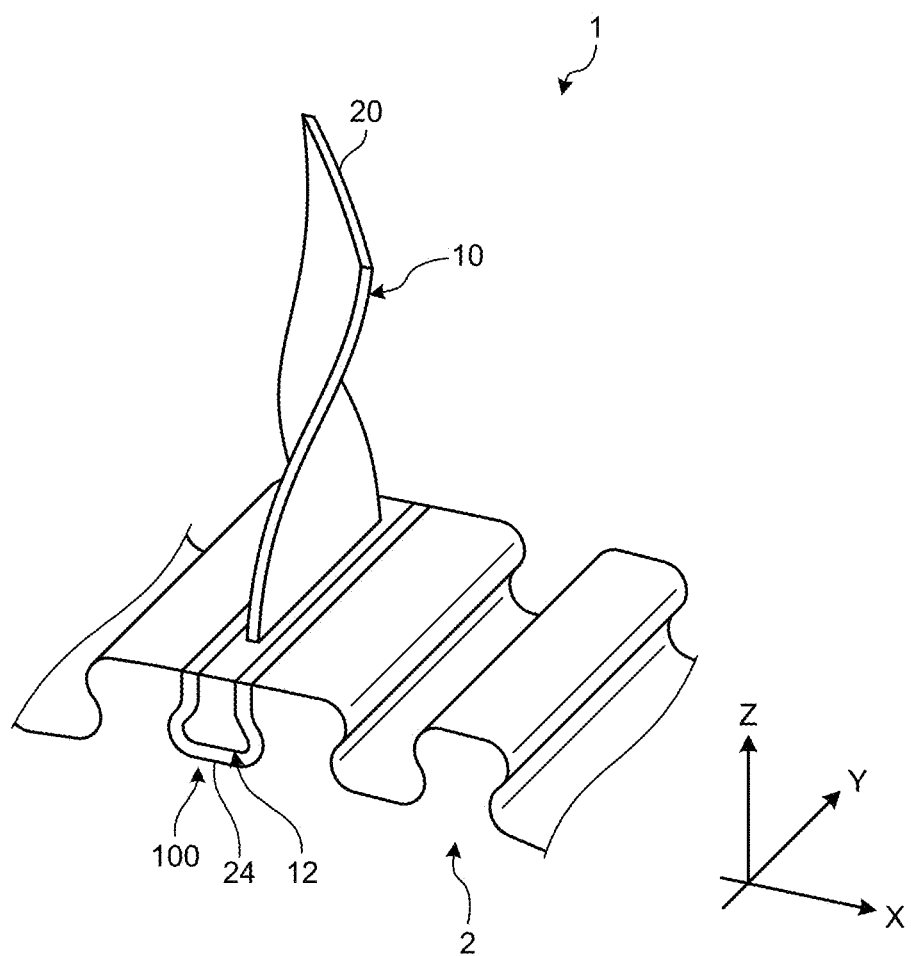
FIG. 1 is a schematic diagram illustrating a configuration of a composite blade according to a first embodiment.

FIG. 1 is a schematic diagram illustrating a configuration of a composite blade according to a first embodiment. A composite blade 1 according to the first embodiment is a turbine blade of a gas turbine. For example, the gas turbine using the composite blade 1, is used for an aircraft engine. However, the gas turbine may also be used for any purpose such as for a gas turbine for generating power.

As illustrated in FIG. 1, the composite blade 1 extends from a tip part 20 to a base end 24. The base end 24 of the composite blade 1 is attached to a turbine disk 2. Hereinafter, directions X, Y, and Z will be described. Hereinafter, the direction Z is the extending direction of the composite blade 1, in other words, the direction along the base end 24 to the tip part 20. The direction Z is the longitudinal direction of the composite blade 1, and corresponds to the radial direction (radiation direction) of the turbine disk 2. Moreover, the direction Y is the direction orthogonal to the direction Z, which is the direction along the thickness direction of the turbine disk 2. Furthermore, the direction X is the direction orthogonal to the direction Y and the direction Z, which is the direction along the circumference direction of the turbine disk 2.

The composite blade 1 includes an airfoil 10 and a blade root 12 (dovetail part). The airfoil 10 is a blade for receiving gas flowing through the gas turbine. The blade root 12 is provided at the terminal end of the airfoil 10. In other words, the airfoil 10 extends from the blade root 12 in the longitudinal direction (direction Z). In the blade root 12, the composite blade 1 is attached to the turbine disk 2. The turbine disk 2 includes a plurality of grooves 100 along the circumferential direction. When the blade root 12 is fitted into each of the grooves 100, the composite blade 1 is attached and fixed to the turbine disk 2.

Figure 2:
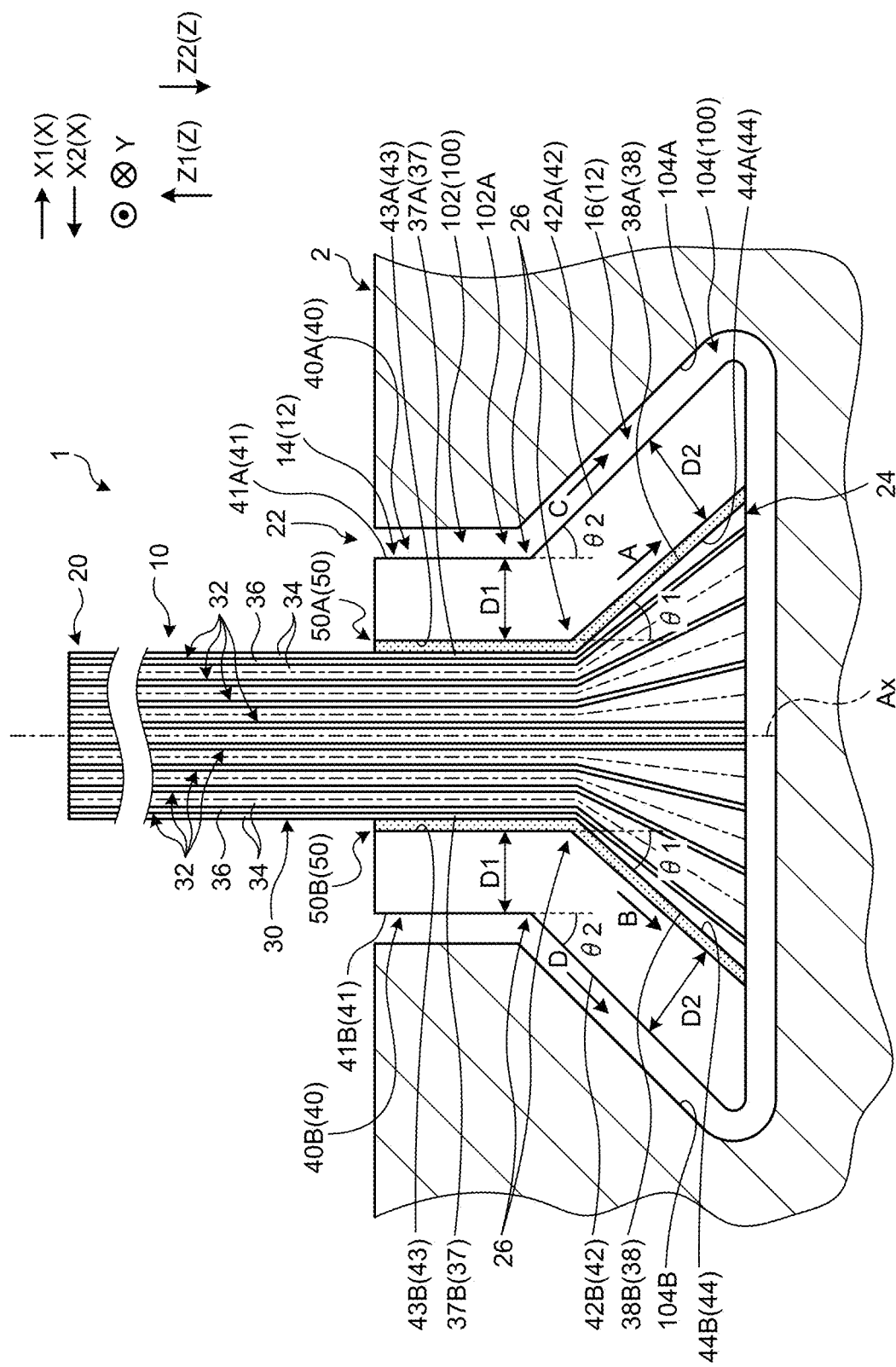
FIG. 2 is a schematic diagram illustrating a detailed configuration of the composite blade according to the first embodiment.

Hereinafter, a structure of the composite blade 1 will be described more in detail. FIG. 2 is a schematic diagram illustrating a detailed configuration of the composite blade according to the first embodiment. FIG. 2 is a sectional view of the composite blade 1 viewed from the direction Y (direction orthogonal to the longitudinal direction), and the sectional surface of which is the surface orthogonal to the direction Y. As illustrated in FIG. 2, the composite blade 1 extends toward a direction Z1, from the base end 24 toward the tip 20. The direction Z1 is one of the directions in the direction Z, which is the direction from the base end 24 toward the tip 20. A direction Z2 is the direction opposite to the direction Z1 (direction from the tip 20 toward the base end 24), which is the other direction of the direction Z. Moreover, one of the directions in the direction X is referred to as a direction X1, and the other direction of the direction X, in other words, the direction opposite to the direction X1, is referred to as a direction X2.

As illustrated in FIG. 2, in the composite blade 1, a section from the tip part 20 to a blade end part 22 is the airfoil 10, and a section from the blade end part 22 to the base end 24 is the blade root 12. The blade end part 22 is the base end of the airfoil 10, which is a part (connection part) of the boundary between the airfoil 10 and the blade root 12. The blade end part 22 is placed between the tip part 20 and the base end 24 in the direction Z. The tip part 20 is an end part at the side opposite to the blade end part 22 of the airfoil 10. Moreover, the base end 24 is an end part at the side opposite to the airfoil 10 (blade end part 22) of the blade root 12. In the airfoil 10, the composite blade 1 extends along the direction Z (longitudinal direction). In the blade root 12, the composite blade 1 extends in a direction inclined in both directions from the direction Z to the direction X, and spreads (projects) to both sides in the direction X.

More specifically, in the blade root 12, the composite blade 1 includes a straight section 14 and a bearing section 16. The straight section 14 is a section from the blade end part 22 to an inclination start part 26 in the blade root 12. Moreover, the bearing section 16 is a section from the inclination start part 26 to the base end 24 in the blade root 12. The inclination start part 26 is placed between the blade end part 22 and the base end 24 in the direction Z. In the straight section 14, the composite blade 1 extends along the direction Z (longitudinal direction). In the bearing section 16, the composite blade 1 extends in a direction inclined in both directions from the direction Z to the direction X, and spreads (projects) to both sides in the direction X, toward the direction Z2. In this manner, in the composite blade 1, the bearing section 16 projects toward both sides in the direction X than the straight section 14. In other words, in the composite blade 1, a surface (surface 42A) of the bearing section 16 at the direction X1 side spreads toward the direction X1 side, toward the direction Z2. Moreover, in the composite blade 1, a surface (surface 42B) of the bearing section 16 at the direction X2 side spreads toward the direction X2 side, toward the direction Z2.

Moreover, as illustrated in FIG. 2, the groove 100 of the turbine disk 2 includes a straight groove 102 and a bearing groove 104. The straight groove 102 is a groove that extends along the direction Z. In other words, the straight groove 102 extends in the radiation direction from the outer periphery of the turbine disk 2 toward the center. The bearing groove 104 is a groove connected to an end part 102A of the straight groove 102. The end part 102A is an end part of the straight groove 102 at the direction Z2 side, which is a part at the innermost side of the straight groove 102 in the radiation direction. The bearing groove 104 is a groove that spreads toward both sides in the direction X, as the bearing groove 104 is separated from the end part 102A. In other words, the bearing groove 104 extends and spreads in a direction away from a center axis Ax of the straight groove 102, toward the direction Z2. In other words, an end surface 104A at the direction X1 side of the straight groove 102 spreads toward the direction X1, toward the direction Z2. Moreover, an end surface 104B at the direction X2 side of the straight groove 102 spreads toward the direction X2, toward the direction Z2. In this manner, the groove 100 is formed in a shape corresponding to the straight section 14 and the bearing section 16 of the composite blade 1. It is to be noted that the turbine disk 2 is made of metal, for example, heat resistant alloy such as ferritic steel and nickel (Ni) based forged alloy.

As illustrated in FIG. 2, the blade root 12 of the composite blade 1 is fitted into the groove 100 of the turbine disk 2. In the composite blade 1, the straight section 14 is disposed in the straight groove 102, and the bearing section 16 is disposed in the bearing groove 104. In the composite blade 1, the surface (surface 41) of the straight section 14 comes into contact with the inner surface of the straight groove 102, and the surface (surface 42) of the bearing section 16 comes into contact with the inner surface of the bearing groove 104. In other words, in the composite blade 1, the airfoil 10 (section from the tip part 20 to the blade end part 22) is not disposed in the groove 100 but is exposed from the groove 100, and the blade root 12 (section from the blade end part 22 to the base end 24) is disposed in the groove 100. In FIG. 2, for the sake of convenience, the surface of the composite blade 1 does not come into contact with the inner surface of the groove 100. However, in reality, the surface of the composite blade 1 comes into contact with the inner surface of the groove 100 as described above.

Moreover, the composite blade 1 includes a laminate 30, a metal body 40, and an adhesive layer 50. First, the laminate 30 will be described.

Configuration of Laminate

The laminate 30 is a laminate obtained by laying up composite layers 32. Each of the composite layer 32 is a composite layer including a plurality of reinforced fibers 36 and resin 34. Moreover, the composite layer 32 is a composite layer obtained by impregnating the reinforced fibers 36 with the resin 34. The composite material in the present embodiment is carbon fiber reinforced plastic (CFRP) in which carbon fibers are used as the reinforced fibers 36. However, the reinforced fibers 36 are not limited to the carbon fibers, and may also be other plastic fibers, glass fibers, or metal fibers. Moreover, for example, the resin 34 is thermosetting resin or thermoplastic resin. The thermosetting resin is epoxy resin, for example. The thermoplastic resin is, for example, polyetheretherketone (PEEK), polyetherketoneketone (PEKK), polyphenylene sulfide (PPS), and the like. However, the resin 34 is not limited thereto, and the other resin may also be used. In the laminate 30 of the present embodiment, eight composite layers 32 are laid up. However, any plural number of layers to be laid up may be chosen.

In the composite layer 32, the reinforced fibers 36 are provided along the direction Y. The resin 34 is filled around the reinforced fibers 36. A part of the resin 34 in the composite layer 32 is integrally formed with another composite layer 32, when the adjacent (laid up) composite layers 32 and the resin 34 adhere to each other. A single composite layer 32 in the laminate 30 includes the reinforced fibers 36 and the surrounding resin 34. The laminate 30 is obtained by laying up the layers including the reinforced fibers 36 and the surrounding resin 34.

As illustrated in FIG. 2, the laminate 30 is provided across the airfoil 10 and the blade root 12. In the airfoil 10, in other words, in the section from the tip part 20 to the blade end part 22, the laid-up composite layers 32 of the laminate 30 extend along the direction Z (longitudinal direction). Moreover, in the airfoil 10, a plurality of the composite layers 32 of the laminate 30 are laid up along the direction X.

In other words, in the airfoil 10, the reinforced fibers 36 in the composite layers 32 of the laminate 30 extend along the direction Z (longitudinal direction). Moreover, in the airfoil 10, the reinforced fibers 36 of the composite layers 32 extending along the direction Y, are laid up along the direction X. In the present embodiment, the reinforced fibers 36 extend along the direction Z in the airfoil 10. However, it is not limited thereto, and the reinforced fibers 36 may also extend so as to be inclined from the direction Z toward the direction Y. In other words, in the airfoil 10, the reinforced fibers 36 may extend toward the direction Z2 side, along a plane parallel to the direction Z. Moreover, the composite layer 32 may also include other reinforced fibers that extend in a direction different from that of the reinforced fibers 36. For example, the other reinforced fibers may also be woven into the reinforced fibers 36.

Moreover, in the blade root 12, the laid-up composite layers 32 of the laminate 30 extend so as to be inclined in the direction away from the center axis Ax toward the direction Z2. The center axis Ax is the center axis of the laminate 30 along the direction Z in the airfoil 10 and the blade root 12. In other words, in the blade root 12, the laminate 30 spreads to both sides (directions X1 and X2) in the direction X, toward the direction Z2. Consequently, in the laminate 30, the blade root 12 projects in the directions (both sides in the direction X) away from the center axis Ax than the airfoil 10.

More specifically, in the straight section 14 of the blade root 12, in other words, in the section from the blade end part 22 to the inclination start part 26, the laid-up composite layers 32 of the laminate 30 extend along the direction Z (longitudinal direction). Moreover, in the straight section 14, the composite layers 32 of the laminate 30 are laid up along the direction X. In the laminate 30, a surface 37A at the direction X1 side in the straight section 14 and a surface 37B at the direction X2 side in the straight section 14 extend along the direction Z. Hereinafter, when the surfaces 37A and 37B are not to be differentiated, the surfaces 37A and 37B are referred to as a surface 37.

In other words, in the straight section 14, the reinforced fibers 36 in the composite layers 32 of the laminate 30 extend along the direction Z (longitudinal direction). However, in the straight section 14, the reinforced fibers 36 may extend toward the direction Z2 side, along a plane parallel to the direction Z.

Moreover, in the bearing section 16 of the blade root 12, in other words, in the section from the inclination start part 26 to the base end 24, the laid-up composite layers 32 of the laminate 30 extend so as to be inclined in the direction away from the center axis Ax toward the direction Z2. The center axis Ax is the center axis of the laminate 30 in the straight section 14. In other words, in the bearing section 16, the laminate 30 spreads to both sides (directions X1 and X2) in the direction X, toward the direction Z2. Consequently, in the laminate 30, the bearing section 16 projects in the direction away from the center axis Ax than the straight section 14.

More specifically, in the bearing section 16, the composite layers 32 at the direction X1 side than the center axis Ax of the laminate 30 inclines toward the direction X1, toward the direction Z2. In the laminate 30, a surface 38A at the direction X1 side of the bearing section 16 extends along the first inclination direction A, toward the base end 24. The first inclination direction A is a direction inclined toward the direction X1 side, with a predetermined angle with respect to the direction Z2.

Moreover, in the bearing section 16, the composite layers 32 at the direction X2 side than the center axis Ax of the laminate 30 inclines toward the direction X2, toward the direction Z2. In the laminate 30, a surface 38B at the direction X2 side of the bearing section 16 extends along a second inclination direction B, toward the base end 24. The second inclination direction B is a direction inclined toward the side opposite to the first inclination direction A, with respect to the direction Z2. The second inclination direction B is also a direction inclined toward the direction X2 side, with a predetermined angle with respect to the direction Z2. Hereinafter, when the surfaces 38A and 38B are not to be differentiated, the surfaces 38A and 38B are referred to as a surface 38. In this case, in the laminate 30, the surface 38 extends in the direction away from the center axis Ax toward the direction Z2. In other words, the surface 38 spreads to both sides in the direction X (directions X1 and X2), toward the direction Z2.

Furthermore, in the bearing section 16, the reinforced fibers 36 in each of the composite layers 32 of the laminate 30 extend so as to be inclined in the direction away from the center axis Ax toward the direction Z2. In other words, in the bearing section 16, the reinforced fibers 36 at the direction X1 side than the center axis Ax of the laminate 30 incline toward the direction X1, toward the direction Z2. Still furthermore, in the bearing section 16, the reinforced fibers 36 at the direction X2 side than the center axis Ax of the laminate 30 incline toward the direction X2, toward the direction Z2.

In the laminate 30 configured in this manner, the composite layers 32 continuously extend from the tip part 20 to the base end 24, via the blade end part 22 and the inclination start part 26. In other words, the composite layers 32 (reinforced fibers 36) extend along the direction Z, from the tip part 20 to the blade end part 22, and from the blade end part 22 to the inclination start part 26. Then, the composite layers 32 (reinforced fibers 36) incline toward both sides (direction away from the center axis Ax) in the direction X at the inclination start part 26, and extend to the base end 24.

Configuration of Adhesive Layer

Next, the adhesive layer 50 will be described. The adhesive layer 50 is an adhesive layer, and is provided on the surface of the laminate 30. The adhesive layer 50 is provided between the metal body 40 and the laminate 30, and bonds the metal body 40 and the laminate 30. The metal body 40 and the laminate 30 are integrally fixed by the adhesive layer 50. More specifically, the adhesive layer 50 includes an adhesive layer 50A and an adhesive layer 50B. The adhesive layer 50A is provided on the surface at the direction X1 side of the laminate 30, in other words, across the surface 37A and the surface 38A, and adheres to the surface (surfaces 37A and 38A) at the direction X1 side of the laminate 30. The adhesive layer 50B is provided on the surface at the direction X2 side of the laminate 30, in other words, across the surface 37B and the surface 38B, and adheres to the surface (surfaces 37B and 38B) at the direction X2 side of the laminate 30. Hereinafter, when the adhesive layers 50A and 50B are not to be differentiated, the adhesive layers 50A and 50B are referred to as the adhesive layer 50.

For example, an adhesive for the adhesive layer 50 includes an epoxy resin adhesive, an acrylic adhesive, and the like. However, any adhesive may be chosen, as long as the adhesive can bond the laminate 30 and the metal body 40.

Configuration of Metal Body

Next, the metal body 40 will be described. The metal body 40 is a metal member provided in the blade root 12. It is preferable that the hardness of the metal body 40 is greater than that of the resin 34 of the laminate 30. Moreover, it is preferable that the material of the metal body 40 is the same as that of the turbine disk 2. For example, it is preferable that the metal body 40 is heat-resistant alloy such as ferritic steel and Ni based forged alloy. However, any metal material may be chosen for the metal body 40.

In the blade root 12, the metal body 40 extends so as to be inclined in the direction away from the center axis Ax toward the direction Z2. In other words, in the blade root 12, the metal body 40 spreads to both sides (directions X1 and X2) in the direction X, toward the direction Z2. Consequently, in the metal body 40, the blade root 12 projects in the directions (both sides in the direction X) away from the center axis Ax than the airfoil 10.

More specifically, in the straight section 14, the metal body 40 is provided on the surface 37 of the laminate 30, and extends along the direction Z (longitudinal direction). Moreover, in the bearing section 16, the metal body 40 is provided on the surface 38 of the laminate 30, and extends so as to be inclined in the direction away from the center axis Ax toward the direction Z2, from the inclination start part 26 to the base end 24. In other words, in the bearing section 16, the metal body 40 spreads to both sides in the direction X, toward the direction Z2.

In particular, the metal body 40 is provided on the surface (one surface) at the direction X1 side of the laminate 30 in the blade root 12, and on the surface (other surface) at the direction X2 side of the laminate 30 in the blade root 12, via the adhesive layer 50. In other words, the metal body 40 includes a metal body 40A at the direction X1 side, and a metal body 40B at the direction X2 side. However, when the metal bodies 40A and 40B are not to be differentiated, the metal bodies 40A and 40B are referred to as the metal body 40.

In the straight section 14, the metal body 40A extends along the direction Z (longitudinal direction). In the straight section 14, the metal body 40A is provided on the surface 37A of the laminate 30, in other words, at the direction X1 side of the surface 37A, via the adhesive layer 50A. The metal body 40A includes a surface 41A and a surface 43A. The surface 41A is the surface at the direction X1 side in the straight section 14 of the metal body 40A, which is the surface at the side opposite to the adhesive layer 50A (laminate 30). The surface 43A is the surface (surface at the side opposite to the surface 41A) at the direction X2 side in the straight section 14 of the metal body 40A, which is the surface at the adhesive layer 50A (laminate 30) side. The surface 43A of the metal body 40A adheres to the adhesive layer 50A, and extends along the direction Z. The surface 41A of the metal body 40A extends along the direction Z.

Moreover, in the bearing section 16, the metal body 40A extends so as to be inclined in the direction X1 toward the direction Z2. In the bearing section 16, the metal body 40A is provided on the surface 38A of the laminate 30, in other words, at the direction X1 side of the surface 38A, via the adhesive layer 50A. The metal body 40A includes the surface 42A and a surface 44A. The surface 42A is the surface at the direction X1 side in the bearing section 16 of the metal body 40A, which is the surface at the side opposite to the adhesive layer 50A (laminate 30). The surface 44A is the surface (surface at the side opposite to the surface 42A) at the direction X2 side in the bearing section 16 of the metal body 40A, which is the surface at the adhesive layer 50A (laminate 30) side.

The surface 44A of the metal body 40A adheres to the adhesive layer 50, and extends along the first inclination direction A. The surface 42A of the metal body 40A extends along a third inclination direction C. The third inclination direction C is a direction inclined toward the direction X1 side, with a predetermined angle with respect to the direction Z2.

In the straight section 14, the metal body 40B extends along the direction Z (longitudinal direction). In the straight section 14, the metal body 40B is provided on the surface 37B of the laminate 30, in other words, at the direction X2 side of the surface 37B, via the adhesive layer 50B. The metal body 40B includes a surface 41B and a surface 43B. The surface 41B is the surface at the direction X2 side in the straight section 14 of the metal body 40B, which is the surface at the side opposite to the adhesive layer 50B (laminate 30). The surface 43B is the surface (surface at the side opposite to the surface 41B) at the direction X1 side in the straight section 14 of the metal body 40B, which is the surface at the adhesive layer 50B (laminate 30) side. The surface 43B of the metal body 40B adheres to the adhesive layer 50B, and extends along the direction Z. The surface 41B of the metal body 40B extends along the direction Z.

Moreover, in the bearing section 16, the metal body 40B extends so as to be inclined in the direction X2 toward the direction Z2. In the bearing section 16, the metal body 40B is provided on the surface 38B of the laminate 30, in other words, at the direction X2 side of the surface 38B, via the adhesive layer 50B. The metal body 40B includes the surface 42B and a surface 44B. The surface 42B is the surface at the direction X2 side in the bearing section 16 of the metal body 40B, which is the surface at the side opposite to the adhesive layer 50B (laminate 30). The surface 44B is the surface (surface at the side opposite to the surface 42B) at the direction X1 side in the bearing section 16 of the metal body 40B, which is the surface at the adhesive layer 50B (laminate 30) side.

The surface 44B of the metal body 40B adheres to the adhesive layer 50, and extends along the second inclination direction B. The surface 42B of the metal body 40B extends along a fourth inclination direction D. The fourth inclination direction D is a direction inclined toward a side opposite to the third inclination direction C with respect to the direction Z2, which is the direction inclined toward the direction X2 side, with a predetermined angle with respect to the direction Z2.

Hereinafter, when the surfaces 41A and 41B are not to be differentiated, the surfaces 41A and 41B are referred to as the surface 41, and when the surfaces 43A and 43B are not to be differentiated, the surfaces 43A and 43B are referred to as a surface 43. The surface 41 is the surface at the side opposite to the adhesive layer 50 (laminate 30) in the straight section 14 of the metal body 40. The surface 43 is the surface at the adhesive layer 50 (laminate 30) side in the straight section 14 of the metal body 40. In this case, in the straight section 14, the metal body 40 can be attached to the surface 37 of the laminate 30, when the surface 43 adheres to the adhesive layer 50. Moreover, the surface 41 of the metal body 40 extends along the direction Z (longitudinal direction). In the straight section 14, the metal body 40 is provided on the surface 37 of the laminate 30, and extends along the direction Z (longitudinal direction).

Hereinafter, when the surfaces 42A and 42B are not to be differentiated, the surfaces 42A and 42B are referred to as the surface 42, and when the surfaces 44A and 44B are not to be differentiated, the surfaces 44A and 44B are referred to as a surface 44. The surface 42 is the surface at the side opposite to the adhesive layer 50 (laminate 30) in the bearing section 16 of the metal body 40. The surface 44 is the surface at the adhesive layer 50 (laminate 30) side in the bearing section 16 of the metal body 40. In this case, in the bearing section 16, the metal body 40 can be attached to the surface 38 of the laminate 30, when the surface 44 adheres to the adhesive layer 50. Moreover, the surface 42 of the metal body 40 extends so as to be inclined in the direction away from the center axis Ax toward the base end 24 (direction Z2). Consequently, the bearing section 16 in the metal body 40 projects in the directions (both sides in the direction X) away from the center axis Ax than the straight section 14.

The metal body 40 configured in this manner continuously extends from the blade end part 22 to the base end 24, via the inclination start part 26. In other words, the metal body 40 extends along the direction Z, from the blade end part 22 to the inclination start part 26. Then, the metal body 40 inclines to both sides (directions away from the center axis Ax) in the direction X at the inclination start part 26, and extends to the base end 24.

In this manner, in the blade root 12 of the composite blade 1, the metal body 40 is attached (fixed) to the surfaces at both sides of the laminate 30, via the adhesive layer 50. In the composite blade 1, the blade root 12 projects in the directions (both sides in the direction X) away from the center axis Ax, than the airfoil 10.

In this example, an angle θ1 is an angle of the surface 44 in the bearing section 16 of the metal body 40 with respect to the direction Z (longitudinal direction). In other words, the angle θ1 is the angle between the surface 44 of the section from the inclination start part 26 to the base end 24, and the direction Z of the segment from the inclination start part 26 to the base end 24. The angle θ1 may also be an angle between the first inclination direction A (second inclination direction B) and the direction Z. An angle θ2 is an angle of the surface 42 in the bearing section 16 of the metal body 40 with respect to the direction Z (longitudinal direction). In other words, the angle θ2 is the angle between the surface 42 of the section from the inclination start part 26 to the base end 24, and the direction Z of the segment from the inclination start part 26 to the base end 24. Moreover, the angle θ2 is an angle between the third inclination direction C (fourth inclination direction D) and the direction Z.

In this case, the angle θ1 is an acute angle, and is preferably 34 degrees or more and 44 degrees or less. Moreover, the angle θ2 is an obtuse angle, and is preferably 42 degrees or more and 52 degrees or less. It is also preferable that the angle θ2 is greater than the angle θ1. However, the angles θ1 and θ2 are not limited thereto, and may be any angle.

Moreover, thickness D1 is the thickness, in other words, the length along the direction X of the metal body 40 in the straight section 14. In other words, the thickness D1 is the length between the surface 41 and the surface 43 in the direction X. Furthermore, thickness D2 is the thickness, in other words, the length in the direction orthogonal to the third inclination direction C (fourth inclination direction D) of the metal body 40 in the bearing section 16. In other words, the thickness D2 is the length between the surface 42 and the surface 44 in the direction orthogonal to the third inclination direction C. In this case, it is preferable that the thickness D2 is greater than the thickness D1.

Method of Manufacturing Composite Blade

Figure 3:
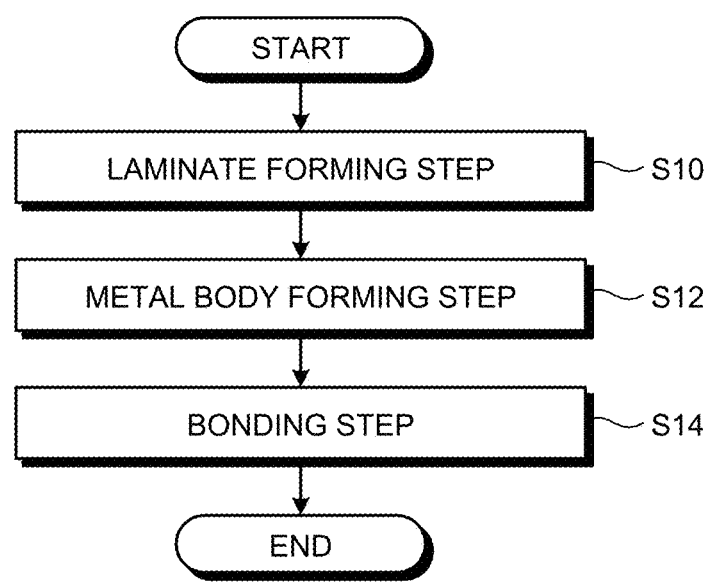
FIG. 3 is a flowchart illustrating a method of manufacturing the composite blade according to the present embodiment.

The structure of the composite blade 1 is as described above. Next, a method of manufacturing the composite blade 1 will be described. FIG. 3 is a flowchart illustrating the method of manufacturing the composite blade according to the present embodiment. As illustrated in FIG. 3, to manufacture the composite blade 1, a laminate forming step will be executed (step S10). At the laminate forming step, the laminate 30 is formed. At the laminate forming step, the laminate 30 is formed such that the laminate 30 extends along the direction Z (longitudinal direction) in the airfoil 10. Then, at the laminate forming step, the laminate 30 is formed such that the laminate 30 extends so as to be inclined in the directions (both sides in the direction X) away from the center axis Ax toward the base end 24, in the blade root 12.

Next, a metal body forming step will be executed (step S12). At the metal body forming step, the metal body 40 is formed. At the metal body forming step, the metal body 40 is formed such that the metal body 40 is provided on one surface and the other surface of the laminate 30 in the blade root 12. Then, at the metal body forming step, the metal body 40 is formed such that the metal body 40 extends so as to be inclined in the directions (both sides in the direction X) away from the center axis Ax toward the base end 24. It is to be noted that step S12 may be simultaneously performed with step S10, or may be performed prior to step S10.

Next, a bonding step will be executed (step S14). At the bonding step, the laminate 30 and the metal body 40 adhere to each other, by applying the adhesive layer 50 before solidification, on the surface of the laminate 30 or on the surface of the metal body 40. Then, the laminate 30 and the metal body 40 are bonded together by solidifying the adhesive layer 50. Consequently, the laminate 30 and the metal body 40 are integrally formed, and the manufacturing of the composite blade 1 is finished. At the bonding step, there is no need to use the adhesive layer 50, as long as the laminate 30 and the metal body 40 can be bonded together.

As described above, the composite blade 1 according to the present embodiment includes the airfoil 10 and the blade root 12 that extend in the longitudinal direction (direction Z). The blade root 12 includes the straight section 14 of the section from the blade end part 22 to the inclination start part 26, and the bearing section 16 of the section from the inclination start part 26 to the base end 24. The blade end part 22 is a connection location of the airfoil 10 and the blade root 12. The base end 24 is the end part at the side opposite to the blade end part 22 (airfoil 10) of the blade root 12. The inclination start part 26 is placed between the blade end part 22 and the base end 24. The composite blade 1 includes the laminate 30 and the metal body 40. The laminate 30 is formed by laying up the composite layers 32 obtained by impregnating the reinforced fibers 36 with the resin 34, and is provided across the airfoil 10 and the blade root 12. The laminate 30 extends along the direction Z in the airfoil 10, extends along the direction Z in the straight section 14, and extends so as to be inclined in the direction away from the center axis Ax toward the base end 24, in the bearing section 16. The metal body 40 is provided in the blade root 12, and is provided on one surface and the other surface of the laminate 30 in the blade root 12. The metal body 40 extends along the direction Z in the straight section 14, and extends so as to be inclined in the direction away from the center axis Ax toward the base end 24, in the bearing section 16.

In the composite blade 1, the blade root 12 is fitted into the groove 100 of the turbine disk 2. With the rotation of the turbine disk 2, a centrifugal force toward the direction Z1 side is applied to the composite blade 1. In the composite blade 1, with this centrifugal force, the surface of the blade root 12 is pressed against the inner surface of the groove 100. In this example, when the uppermost surface of the blade root 12 is the laminate 30, the surface of the laminate 30 is pressed against the inner surface of the groove 100. In this case, the resin 34 of the laminate 30 is pressed against the inner surface of the groove 100, and may be worn out. Moreover, the inner surface of the groove 100 is pressed against the reinforced fibers 36 of the laminate 30, and may be worn out. However, in the composite blade 1 according to the present embodiment, in the blade root 12, the metal body 40 is provided on both surfaces of the laminate 30. Thus, when a centrifugal force is applied to the composite blade 1, the surface of the metal body 40 is pressed against the inner surface of the groove 100. In this case, it is possible to prevent abrasion because pieces of metal come into contact with each other. In this manner, by providing the metal body 40, the composite blade 1 according to the present embodiment can prevent the abrasion of the blade root 12 and the turbine disk 2.

Moreover, in the composite blade 1, when a centrifugal force is applied toward the direction Z1, a force for peeling the composite layers 32 is applied to the laminate 30 in the blade root 12. However, in the present embodiment, the metal body 40 is attached to both surfaces of the laminate 30 in the blade root 12. In the metal body 40, when a centrifugal force is applied, a force for pressing the composite layers 32 of the laminate 30 to each other is applied. Thus, when the centrifugal force is applied toward the direction Z1, the composite blade 1 can prevent the composite layers 32 from peeling off. Moreover, because the thickness of the laminate 30 can be reduced as much as the metal body 40, it is possible to easily manufacture the composite blade 1. Moreover, in the composite blade 1, for example, by forming the metal body 40 so as to have the same shape as that of another metal turbine blade, it is possible to replace the composite blade 1 with the other turbine blade.

In the composite blade 1, due to the centrifugal force in the direction Z1, the bearing section 16 of the blade root 12 is pressed against the bearing groove 104 in the turbine disk 2. Because the metal body 40 is provided in the bearing section 16, the composite blade 1 can suitably prevent the abrasion of the blade root 12 and the turbine disk 2. Moreover, in the composite blade 1, due to the centrifugal force in the direction Z1, a tensile stress and a shearing stress occur to the composite layers 32 of the laminate 30. When these stresses are increased, the laminate 30 may be damaged. However, in the composite blade 1, the metal body 40 is also provided on the surface of the laminate 30 in the straight section 14. Because the metal body 40 in the straight section 14 is integrated with the laminate 30 by adhering thereto, the metal body 40 can reduce the stress applied to the laminate 30, by receiving a part of the stress applied to the laminate 30. Thus, by providing the metal body 40, the composite blade 1 can prevent the laminate 30 from being damaged.

Moreover, in the metal body 40, the angle θ2 with respect to the direction Z (longitudinal direction) of the surface 42 in the bearing section 16 is greater than the angle θ1 with respect to the direction Z of the surface 44 in the bearing section 16. Because the inclined angle θ1 at the inside of the metal body 40 is made smaller than the inclined angle θ2 at the outside, due to the wedge effect, the composite blade 1 can effectively prevent the metal body 40 from coming off, caused by the centrifugal force in the direction Z2. On the other hand, when the inclined angle θ1 at the inside of the metal body 40 is made greater than the inclined angle θ2 at the outside, a compression force in the direction X is generated on the adhesive between the surface 37 of the composite blade and the metal body 40. Consequently, it is possible to effectively prevent the adhesive from peeling off. In this case, the metal body 40 is prevented from coming off, by the bent part of the inclination start part 26.

Furthermore, the composite blade 1 includes the adhesive layer 50. The adhesive layer 50 is provided between the metal body 40 and the laminate 30, and bonds the metal body 40 and the laminate 30. Because the metal body 40 and the laminate 30 are suitably bonded together by the adhesive layer 50, the composite blade 1 can suitably prevent the abrasion of the metal body 40 and the laminate 30.

Still furthermore, the blade root 12 is attached to the turbine disk 2. The turbine disk 2 includes the straight groove 102 and the bearing groove 104. The straight groove 102 extends along the longitudinal direction (direction Z). The bearing groove 104 is connected to the end part 102A of the straight groove 102, and spreads in the direction away from the center axis of the straight groove 102, as the bearing groove 104 is separated from the end part 102A. In the composite blade 1, the straight section 14 is disposed in the straight groove 102, and the bearing section 16 is disposed in the bearing groove 104. In the composite blade 1, when a centrifugal force is applied, the inner surface of the bearing groove 104 and the surface of the metal body 40 come into contact with each other. Thus, when the composite blade 1 is attached to the turbine disk 2 in this manner, the composite blade 1 can suitably prevent the abrasion of the blade root 12 and the turbine disk 2.

Figure 4:
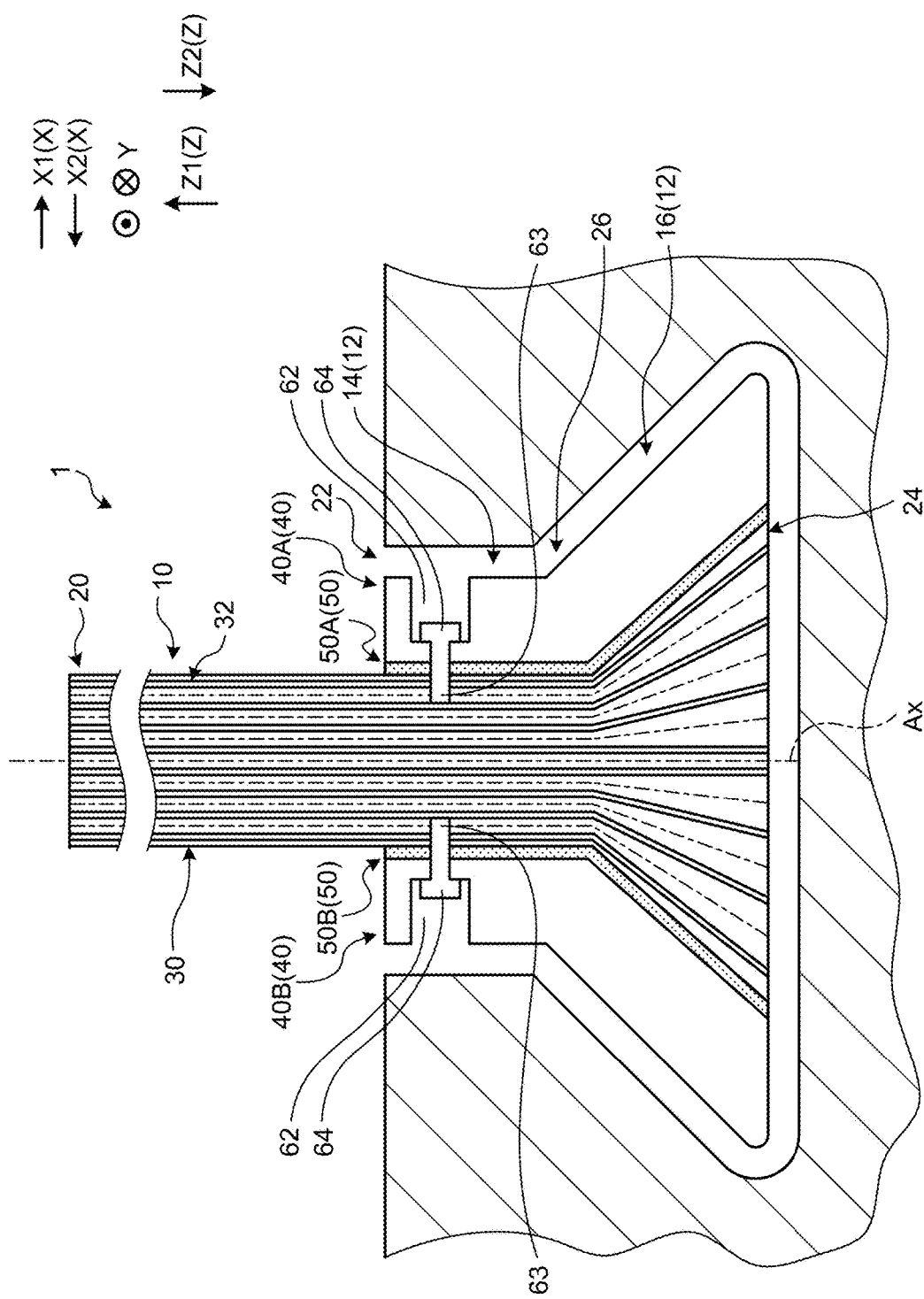
FIG. 4 is a schematic diagram illustrating another example of the composite blade according to the first embodiment.

FIG. 4 is a schematic diagram illustrating another example of the composite blade according to the first embodiment. In the composite blade 1, the laminate 30 and the metal body 40 are bonded together by the adhesive layer 50. However, the bonding method is not limited thereto. For example, as illustrated in FIG. 4, the laminate 30 and the metal body 40 may be bonded together with a bolt 64, in addition to the adhesive layer 50. In this case, as illustrated in FIG. 4, in the straight section 14, an opening 62 is opened in the metal body 40. Then, in the straight section 14, an opening 63 communicated with the opening 62 is opened in the laminate 30. Then, in the composite blade 1, the laminate 30 and the metal body 40 are bonded together, by screwing the bolt 64 from the openings 62 and 63. In this case, a force (force in a compressing direction) in the direction toward which the laminate 30 and the metal body 40 are brought close to each other can be applied. In the example in FIG. 4, the bolt 64 is used for bonding the laminate 30 and the metal body 40 in addition to the adhesive layer 50. However, for example, the adhesive layer 50 may not be provided, and the laminate 30 and the metal body 40 may be bonded together only by the bolt 64.

Next, a second embodiment will be described. In a composite blade 1a according to the second embodiment, the structures of a metal body 40a and an adhesive layer 50a are different from those in the first embodiment. In the second embodiment, a description of the parts common to those in the first embodiment is omitted.

Figure 5:
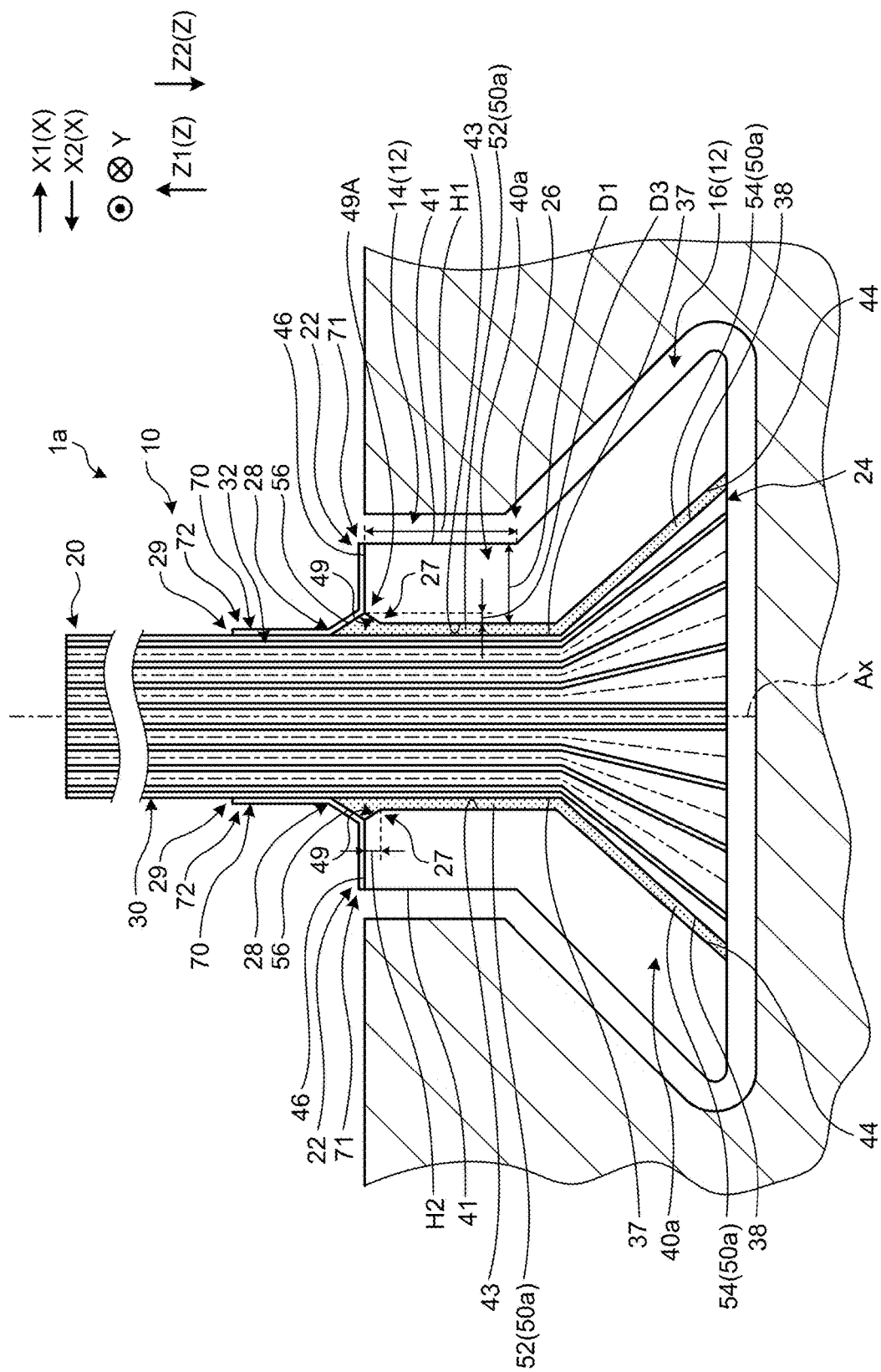
FIG. 5 is a schematic diagram illustrating a detailed configuration of a composite blade according to a second embodiment.

FIG. 5 is a schematic diagram illustrating a detailed configuration of a composite blade according to the second embodiment. As illustrated in FIG. 5, the composite blade 1a includes the laminate 30, the metal body 40a, the adhesive layer 50a, and an overlay part 70.

The metal body 40a includes a notch part 49. The notch part 49 is a notch (groove) provided on the surface 43 of the metal body 40a in the straight section 14. The notch part 49 is provided on the surface 43 across a notch start part 27 and the blade end part 22. The notch start part 27 is a part provided between the blade end part 22 and the inclination start part 26. In the notch part 49, the notch starts from the notch start part 27, and the depth of the notch part 49 along the direction X becomes deeper, toward the blade end part 22. The bottom part of the blade end part 22 of the notch part 49 in the direction X is referred to as a bottom part 49A. The bottom part 49A is placed between the surface 43 and the surface 41, and the notch part 49 does not penetrate to the surface 41. The shape of the notch part 49 is such that the groove provided from the notch start part 27 to the blade end part 22 extends across both ends along the direction Y of the metal body 40a.

In this example, length H1 is the length of the straight section 14 in the metal body 40a along the direction Z, in other words, the length of the metal body 40a from the blade end part 22 to the inclination start part 26 along the direction Z. Length H2 is the length of the notch part 49 along the direction Z, in other words, the length from the notch start part 27 to the blade end part 22 along the direction Z. Length D3 is the length (depth) of the notch part 49 along the direction X, in other words, the length (depth) from the surface 43 to the bottom part 49A along the direction X.

In this case, it is preferable that the length H2 is 10% or more and 60% or less than the length H1. Moreover, it is preferable that the length D3 is 10% or more and 50% or less than the thickness D1. Furthermore, it is preferable that the length H2 is 5 mm or more and 30 mm or less. Still furthermore, it is preferable that the length D3 is 1 mm or more and 5 mm or less. However, the lengths of the lengths H2 and D3 are not limited thereto, and any length may be chosen for them.

The adhesive layer 50a is provided across the blade root 12 and the airfoil 10. In particular, similar to the first embodiment, in the blade root 12, the adhesive layer 50a is provided across the base end 24 and the blade end part 22. In the airfoil 10, the adhesive layer 50a is provided across the blade end part 22 and an adhesive end part 28. In other words, the adhesive layer 50a is provided from the base end 24 to the adhesive end part 28, via the blade end part 22. The adhesive end part 28 is a part provided between the tip part 20 and the blade end part 22 in the airfoil 10.

In the straight section 14, in other words, from the inclination start part 26 to the blade end part 22, the adhesive layer 50a is provided between the surface 43 of the metal body 40a and the surface 37 of the laminate 30. The notch part 49 is provided on the surface 43. Thus, in the part where the notch part 49 is provided, the thickness (length along the direction X) of the adhesive layer 50a is increased from the notch start part 27 toward the blade end part 22. The adhesive layer 50a is provided on the surface of the laminate 30 in the airfoil 10. In the airfoil 10, the thickness (length along the direction X) of the adhesive layer 50a is reduced from the blade end part 22 toward the adhesive end part 28. In the airfoil 10, the metal body 40a is not provided. Consequently, in the airfoil 10, the adhesive layer 50a is exposed from the metal body 40a, but covered by the overlay part 70, which will be described below.

The adhesive layer 50a also includes a soft adhesive layer 52 and a high strength adhesive layer 54. The soft adhesive layer 52 is an adhesive layer provided across the straight section 14 and the airfoil 10. In other words, the soft adhesive layer 52 is provided from the inclination start part 26 to the adhesive end part 28, via the blade end part 22. Thus, in the present embodiment, the thickness of the soft adhesive layer 52 is increased from the notch start part 27 toward the blade end part 22. The thickness of the soft adhesive layer 52 is reduced from the blade end part 22 toward the adhesive end part 28. Moreover, the high strength adhesive layer 54 is an adhesive layer provided in the bearing section 16. The high strength adhesive layer 54 is provided between the surface 44 of the metal body 40a and the surface 38 of the laminate 30, across the inclination start part 26 and the base end 24. The soft adhesive layer 52 may not be provided on the entire range of the straight section 14. The soft adhesive layer 52 may only be provided on a part close to the blade end part 22 and with large stiffness variation, and the high strength adhesive layer 54 may be provided on the other part. In other words, the soft adhesive layer 52 may be provided on at least a part of the straight section 14, more specifically, at the blade end part 22 side in the direction Z. The other part of the straight section 14 may be the soft adhesive layer 52 or the high strength adhesive layer 54.

The soft adhesive layer 52 is a layer formed of an acrylic adhesive, and has a lower elastic modulus (is elastically deformable) than the high strength adhesive layer 54. Moreover, the high strength adhesive layer 54 is a layer formed of an epoxy resin adhesive, and has higher rapture strength and elastic modulus than those of the soft adhesive layer 52. However, the soft adhesive layer 52 is not limited to the acrylic adhesive layer, as long as the elastic modulus of the soft adhesive layer 52 is lower than that of the high strength adhesive layer 54. Similarly, the high strength adhesive layer 54 is not limited to the epoxy resin adhesive, as long as the rapture strength and elastic modulus of the high strength adhesive layer 54 are higher than those of the soft adhesive layer 52.

The overlay part 70 is a sheet-like member, and preferably a sheet-like member of the composite layer 32. The overlay part 70 covers and is bonded to an end surface 46 of the metal body 40a, a surface 56 of the adhesive layer 50a in the airfoil 10, and a surface of the laminate 30 from the adhesive end part 28 to an overlay end part 29. The end surface 46 is an end surface of the metal body 40a at the direction Z1 side in the blade end part 22. The overlay end part 29 is a part provided between the tip part 20 and the adhesive end part 28 in the airfoil 10.

More specifically, in the overlay part 70, one end part 71 is provided on the end surface 46 of the metal body 40a, and the other end part 72 is provided on the surface of the overlay end part 29 in the laminate 30. In other words, the overlay part 70 is provided across and covers the surface from the adhesive end part 28 and the overlay end part 29 of the laminate 30, via the end surface 46 of the metal body 40a to the surface 56 of the adhesive layer 50a. In this example, the length of the overlay part 70 along the direction Z of the area that covers the surface of the laminate 30 (length along the direction Z from the adhesive end part 28 to the overlay end part 29) is longer than the length of the area that covers the end surface 46 of the metal body 40a along the direction X (length along the direction X from one end part 71 to the bottom part 49A of the notch part 49).

As described above, in the second embodiment, the notch part 49 is provided on the metal body 40a. On the surface 43 of the metal body 40a in the straight section 14, the notch part 49 is provided across the notch start part 27 and the blade end part 22. The depth of the notch part 49 is increased from the notch start part 27 toward the blade end part 22. In the composite blade 1a according to the second embodiment, by providing the notch part 49, it is possible to reduce the local stress in the end part of the contact part between the metal body 40a and the laminate 30, caused when the metal body 40a and the laminate 30 are brought into contact with each other. Consequently, the composite blade 1a can relieve the stress concentration of the laminate 30 at the end part of the contact part. Thus, the composite blade 1a can prevent the laminate 30 from being damaged.

Moreover, the adhesive layer 50a is provided on the surface of the laminate 30 in the airfoil 10, across the blade end part 22 and the adhesive end part 28. The thickness of the adhesive layer 50a is increased from the notch start part 27 in the blade root 12 toward the blade end part 22, and the thickness of the adhesive layer 50a is reduced from the blade end part 22 toward the adhesive end part 28 in the airfoil 10. Because the thickness of the adhesive layer 50a is inclined in this manner, the composite blade 1a according to the second embodiment can relieve the discontinuity of stiffness between the airfoil 10 and the blade root 12, and prevent the laminate 30 from being damaged.

Furthermore, the adhesive layer 50a includes the soft adhesive layer 52 provided at the blade end part 22 side of the straight section 14, and the high strength adhesive layer 54 provided in the bearing section 16. The elastic modulus of the soft adhesive layer 52 is lower than that of the high strength adhesive layer 54, and the rapture strength and elastic modulus of the high strength adhesive layer 54 are higher than those of the soft adhesive layer 52. In the laminate 30, a high local stress occurs on the straight section 14 at the blade end part 22 side, in other words, around the end surface of the contact part with the metal body 40. However, by providing the soft adhesive layer 52 with a high elasticity at the blade end part 22 side in the straight section 14, the composite blade 1*a* according to the second embodiment can relieve the local stress. Still furthermore, in the composite blade 1*a*, a high surface pressure is applied to the bearing section 16. When the high strength adhesive layer 54 with high rapture strength and elastic modulus is provided in the bearing section 16, the composite blade 1*a* can prevent the strength of the bearing section 16 from reducing. In this manner, by providing the soft adhesive layer 52 and the high strength adhesive layer 54, the composite blade 1*a* can prevent the strength of the bearing section 16 from reducing, while relieving the local stress in the straight section 14.

Still furthermore, the composite blade 1*a* includes the overlay part 70. The overlay part 70 is a sheet-like member. The overlay part 70 covers from the end surface 46 of the metal body 40*a*, to the surface of the laminate 30 at a side that is closer to the tip part 20 than the adhesive end part 28 is, via the surface of the adhesive layer 50*a* from the blade end part 22 to the adhesive end part 28. The overlay part 70 continuously covers and bonds the end surface 46 of the metal body 40*a*, the surface of the adhesive layer 50*a*, and the surface of the laminate 30. Consequently, the overlay part 70 can relieve the stress for peeling off the adhesive layer 50*a* caused by the force applied from the direction X.

Next, a third embodiment will be described. In the third embodiment, the structure of a metal body 40*b* is different from that in the first embodiment. In the third embodiment, a description of the parts common to those in the first embodiment is omitted.

Figure 6:
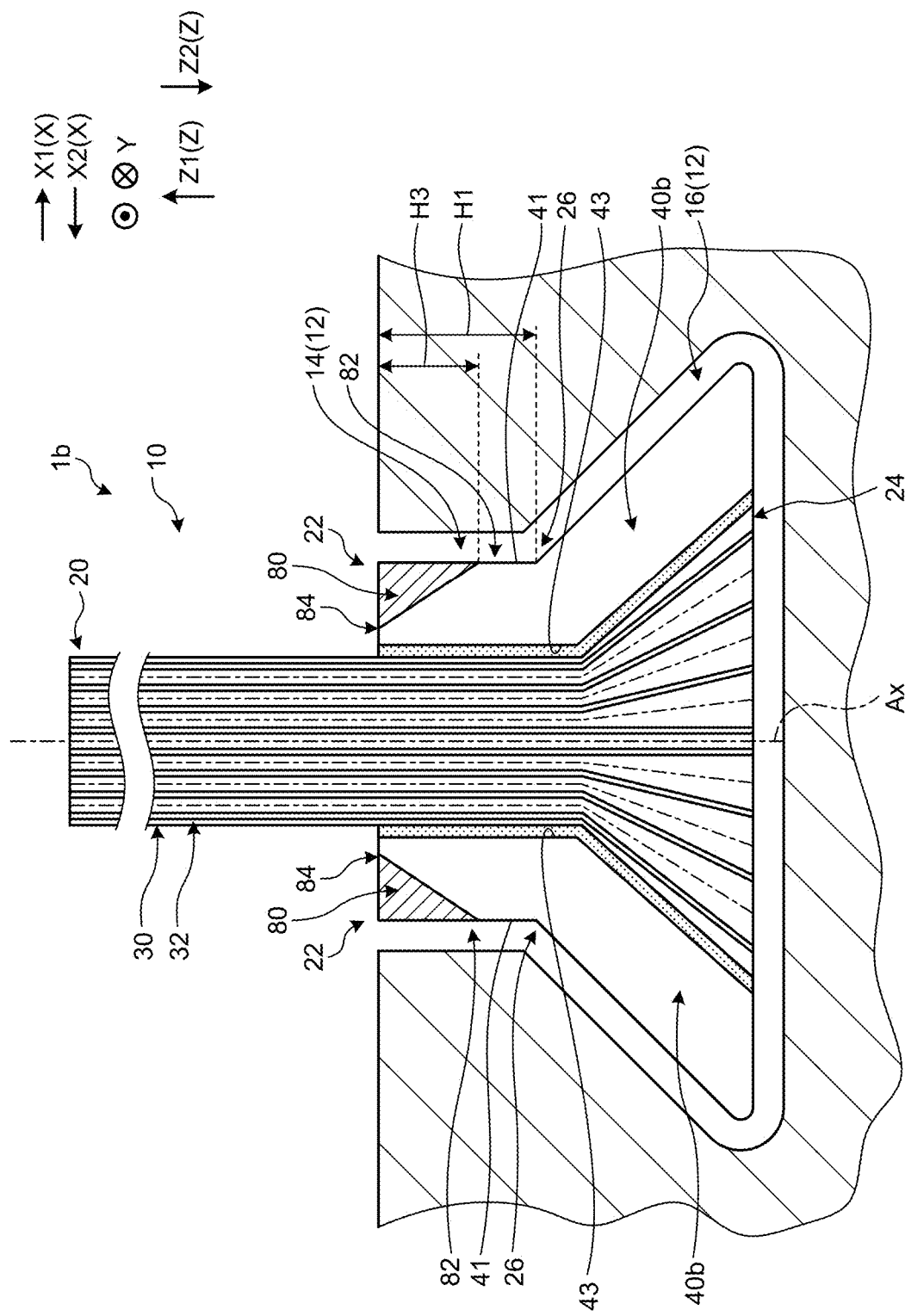
FIG. 6 is a schematic diagram illustrating a detailed configuration of a composite blade according to a third embodiment.

FIG. 6 is a schematic diagram illustrating a detailed configuration of a composite blade according to the third embodiment. As illustrated in FIG. 6, a composite blade 1*b* includes the metal body 40*b*. In the metal body 40*b*, a thin part 80 is provided on the surface 41 in the straight section 14. In the present embodiment, the thin part 80 is a groove provided on the surface 41. The thin part 80 is provided on the surface 41 across a thinning start part 82 and the blade end part 22. The thinning start part 82 is a part provided between the blade end part 22 and the inclination start part 26. The thinning (notch) of the thin part 80 starts from the thinning start part 82, and the depth of the thin part 80 along the direction X is increased toward the blade end part 22. A bottom part 84 is a bottom part in the direction X in the blade end part 22 of the thin part 80. The bottom part 84 is placed between the surface 43 and the surface 41. In other words, in the surface 41, the thin part 80 is thinned to the depth (bottom part 84) between the surface 43 and the surface 41, and the thin part 80 does not penetrate to the surface 43. In the present embodiment, the thin part 80 is formed in a groove shape provided across the thinning start part 82 and the blade end part 22. However, any shape may be chosen. In the straight section 14, the thin part 80 may be an opening provided across the surface 41 and the bottom part 84, and is preferable that the thin part 80 does not penetrate to the surface 43.

In this example, length H3 is the length of the thin part 80 along the direction Z, in other words, the length from the blade end part 22 to the thinning start part 82 along the direction Z. In this case, it is preferable that the length H3 is 25% or more and 80% or less than the length H1. By setting the length H3 within this range, it is possible to provide the thinning start part 82 in a part where the stress between the composite layers 32 in the laminate 30 is switched from the compressing direction to the pulling direction, and provide the thin part 80 in an area where the stress occurs in the pulling direction. Consequently, it is possible to more suitably relieve the local stress.

Figure 7:
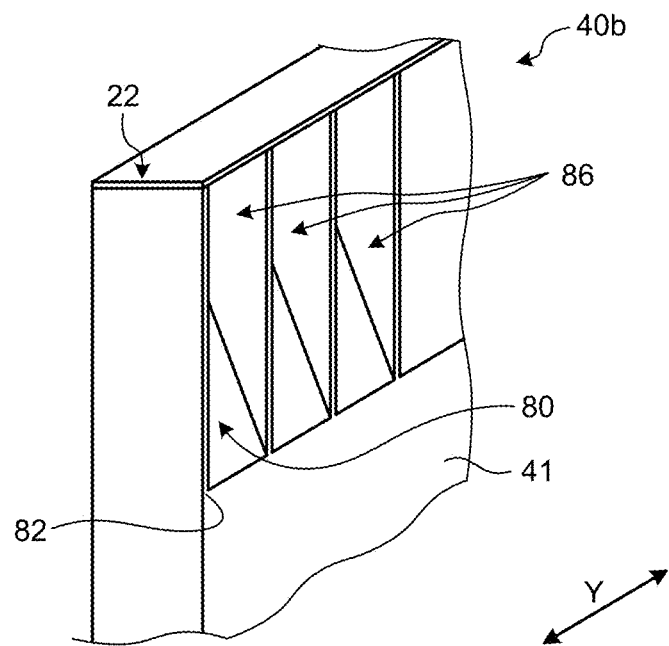
FIG. 7 is a schematic diagram illustrating an example of a thin part.

FIG. 7 is a schematic diagram illustrating an example of the thin part. As illustrated in FIG. 7, a plurality of the thin parts 80 may be provided along the direction Y with a wall part 86 therebetween. However, the shape of the thin part 80 is such that the groove provided from the thinning start part 82 to the blade end part 22 extends across both ends along the direction Y of the metal body 40*b*.

As described above, in the composite blade 1*b* according to the third embodiment, the metal body 40*b* includes the thin part 80. The thin part 80 is an opening (groove) thinned to the depth between the surface 41 and the surface 43, on the surface 41 in the straight section 14 of the metal body 40*b*. In the straight section 14, a high local stress occurs around the end surface of the contact part between the laminate 30 and the metal body 40. However, in the composite blade 1*b*, the surface 41 at the side opposite to the laminate 30 of the metal body 40*b* is thinned. Consequently, the composite blade 1*b* can reduce the stiffness of the metal body 40 in the straight section 14, and relieve the local stress around the end surface of the contact part with the metal body 40*b*.

Still furthermore, the thin part 80 is the groove provided across the thinning start part 82 and the blade end part 22, and the depth of the thin part 80 is increased from the thinning start part 82 toward the blade end part 22. In the composite blade 1*b*, the thinning depth of the surface 41 at the side opposite to the laminate 30 of the metal body 40*b* is increased toward the blade end part 22. Consequently, this composite blade 1*b* can more suitably relieve the local stress around the end surface of the contact part with the metal body 40*b*.

Example

Figure 8:
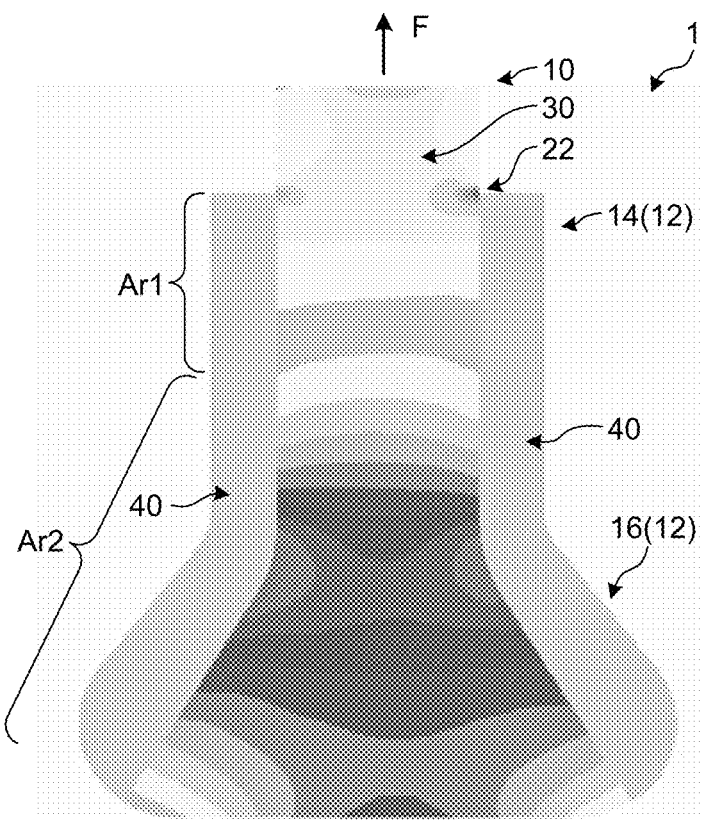
FIG. 8 is a diagram illustrating a stress distribution according to an example.

Next, an example will be described. FIG. 8 is a diagram illustrating a stress distribution according to the example. The example uses a model of the composite blade 1 according to the first embodiment to analyze the stress distribution while the centrifugal force in the direction Z1 is applied, and the blade root 12 is restrained in the groove 100 of the turbine disk 2. As illustrated in FIG. 8, in the model of the composite blade 1, when a centrifugal force F is applied, in an area Ar1, the stress between the composite layers 32 of the laminate 30 is applied in the pulling direction. Then, in an area Ar2, the stress between the composite layers 32 of the laminate 30 is applied in the compressing direction. The area Ar1 is an area from the blade end part 22 to a part around the center of the straight section 14. The area Ar2 is an area across the part around the center of the straight section 14 and the bearing section 16. In other words, in the example, it is clear that the stress between the composite layers 32 of the laminate 30 is switched from the compressing direction to the pulling direction, at around the center of the straight section 14. Thus, by setting the length H3 disclosed in the third embodiment to 25% or more and 80% or less than the length H1, it is clear that the thin part 80 can be suitably provided in the area where the stress occurs in the pulling direction.

The embodiments of the present disclosure have been described as above. However, it is not intended to limit the embodiments by what has been described in the embodiments. The components described above include components that can be easily assumed by those skilled in the art, components that are substantially the same, and components that fall within what is called a range of equivalents.

Moreover, the components described above can be suitably combined with each other. Furthermore, various omissions, substitutions, and changes of the components may be made without departing from the scope and spirit of the embodiments described above.

REFERENCE SIGNS LIST

1 Composite blade
2 Turbine disk
10 Airfoil
12 Blade root
14 Straight section
16 Bearing section
20 Tip part
22 Blade end part
24 Base end
30 Laminate
32 Composite layer
34 Resin
36 Reinforced fibers
40, 40A, 40B Metal body
50, 50A, 50B Adhesive layer
Ax Center axis

The invention claimed is:

1. A composite blade comprising:
an airfoil extending in a longitudinal direction; and
a blade root including a straight section that is a section from a blade end part being a connection location with the airfoil to an inclination start part being a location between the blade end part and a base end, and a bearing section that is a section from the inclination start part to the base end, wherein
a laminate formed by laying up composite layers in which reinforced fibers are impregnated with resin is provided across the airfoil and the blade root,
a metal body is provided on the blade root,
the laminate extends along the longitudinal direction in the airfoil, extends along the longitudinal direction in the straight section, and extends so as to be inclined in a direction away from a center axis along the longitudinal direction of the airfoil toward the base end of the blade root in the bearing section,
the metal body is provided on one surface and another surface of the laminate in the blade root, extends along the longitudinal direction in the straight section, and extends so as to be inclined in a direction away from the center axis toward the base end in the bearing section,
in the metal body, an angle of a surface on an opposite side to the laminate in the bearing section with respect to the longitudinal direction is greater than an angle of a surface on the laminate side in the bearing section with respect to the longitudinal direction,
an adhesive layer is provided between the metal body and the laminate to bond the metal body and the laminate, and
on a surface on an adhesive layer side at the straight section, the metal body includes a notch part that is provided across a notch start part and the blade end part, the notch start part being between the inclination start part and the blade end part, the notch part having a depth increasing from the notch start part toward the blade end part.

2. The composite blade according to claim 1, wherein the adhesive layer includes a soft adhesive layer provided on a blade end part side at the straight section, and a high strength adhesive layer provided at the bearing section, and the high strength adhesive layer has a higher rapture strength and a higher elastic modulus than the soft adhesive layer.

3. The composite blade according to claim 1, wherein the adhesive layer is provided on a surface of the laminate in the airfoil, across the blade end part and an adhesive end part that is between a tip part of the airfoil on an opposite side to the blade end part and the blade end part, and the adhesive layer has a thickness increasing from the notch start part toward the blade end part in the blade root and a thickness decreasing from the blade end part toward the adhesive end part in the airfoil.

4. The composite blade according to claim 3, further comprising an overlay part that is a sheet that covers from an end surface of the metal body in the blade end part to a surface of the laminate on the tip part side with respect to the adhesive end part, via a surface of the adhesive layer from the blade end part to the adhesive end part.

5. The composite blade according to claim 1, wherein, on the surface at the side opposite to the laminate in the straight section, the metal body includes a thin part that is thinned to a depth at a location between the surface on the opposite side to the laminate to the surface on the laminate side.

6. The composite blade according to claim 5, wherein the thin part is a groove that is provided across a thinning start part and the blade end part, the thinning start part being between the inclination start part and the blade end part, the thin part having a depth increasing from the thinning start part toward the blade end part.

7. The composite blade according to claim 1, wherein
the blade root is attached to a turbine disk including a straight groove that extends along the longitudinal direction, and a bearing groove that is connected to an end part of the straight groove, and that spreads in a direction away from a center axis of the straight groove as the bearing groove is separated from an end part of the straight groove,
the straight section is disposed in the straight groove, and the bearing section is disposed in the bearing groove.

8. A method of manufacturing a composite blade that includes an airfoil extending in a longitudinal direction, and a blade root including a straight section that is a section from a blade end part being a connection location with the airfoil to an inclination start part being a location between the blade end part and a base end, and a bearing section that is a section from the inclination start part to the base end, the method comprising:
forming a laminate, by laying up composite layers in which reinforced fibers are impregnated with resin, across the airfoil and the blade root;
forming a metal body that is provided on the blade root, and
providing an adhesive layer between the metal body and the laminate to bond the metal body and the laminate,
wherein the forming of the laminate includes forming the laminate such that the laminate extends along the longitudinal direction in the airfoil, extends along the longitudinal direction in the straight section, and extends so as to be inclined in a direction away from a center axis along the longitudinal direction of the airfoil toward the base end of the blade root in the bearing section,
the forming of the metal body includes forming the metal body such that the metal body is provided on one surface and another surface of the laminate in the blade root, extends along the longitudinal direction in the straight section, and extends so as to be inclined in a direction away from the center axis toward the base end in the bearing section, and such that an angle of a surface of the metal body on an opposite side to the laminate in the bearing section with respect to the longitudinal direction is greater than an angle of a surface on the laminate side in the bearing section with respect to the longitudinal direction, and the forming of the metal body is performed such that, on a surface on an adhesive layer side at the straight section, the metal body includes a notch part that is provided across a notch start part and the blade end part, the notch start part being between the inclination start part and the blade end part, the notch part having a depth increasing from the notch start part toward the blade end part.

* * * * *